United States Patent
Lacroix et al.

(10) Patent No.: US 6,176,263 B1
(45) Date of Patent: Jan. 23, 2001

(54) CIRCUIT BREAKER FOR PRESSURIZED-FLUID HANDLING INSTALLATION

(75) Inventors: Jean-Jacques Lacroix, Lovagny; André Pavan, Faverges, both of (FR)

(73) Assignee: Staubi Faverges, Faverges (FR)

( * ) Notice: Under 35 U.S.C. 154(b), the term of this patent shall be extended for 0 days.

(21) Appl. No.: 09/327,195

(22) Filed: Jun. 7, 1999

(30) Foreign Application Priority Data

Jun. 30, 1998 (FR) .................................... 98 08476

(51) Int. Cl.[7] ...................................................... F16L 37/28
(52) U.S. Cl. .................... 137/614; 137/614.04; 251/175; 251/149.6
(58) Field of Search ....................... 137/614.04, 614.03, 137/614; 251/149.1, 175, 149.6

(56) References Cited

U.S. PATENT DOCUMENTS 5,771,927 * 6/1998 Johansen et al. ............... 137/614.04

FOREIGN PATENT DOCUMENTS

| 1039178 | 10/1953 | (FR) . |
|---|---|---|
| 581087 | 10/1946 | (GB) . |

* cited by examiner

*Primary Examiner*—Kevin Lee
(74) *Attorney, Agent, or Firm*—Dowell & Dowell, PC (57) ABSTRACT

This invention relates to a circuit breaker for an installation handling pressurized fluid comprising an internal valve, at least one joint of substanially toroidal shape being disposed in an accommodating housing around said valve and/or a member for maneuvering the valve, characterized in that the housing is connected, via at least one fluid-circulation channel, to a counter-pressure zone formed downstream of the joint around the valve or the maneuvering member. During a transitory phase of opening of the valve, a preferential flow circuit of the fluid is arranged between the housing and the counter-pressure zone through the channel. Thanks to the counter-pressure exerted on the seal, the latter does risk being dislocated with respect to its housing.

18 Claims, 6 Drawing Sheets

CIRCUIT BREAKER FOR PRESSURIZED-FLUID HANDLING INSTALLATION

BACKGROUND OF THE INVENTION

1. Field of the Invention

The present invention relates to a circuit breaker for an installation handling fluid under pressure such as a gas or a liquid, in particular water, freon, an oil, etc . . .

2. Discussion of the Related Art

It is known to produce a circuit breaker comprising two elements, male and female, adapted to fit axially in each other, causing an internal valve to open. Such a valve is generally provided with an O-ring intended to ensure seal between the valve and a sealing body disposed around the valve when the valve is in closed position.

Figure 7:
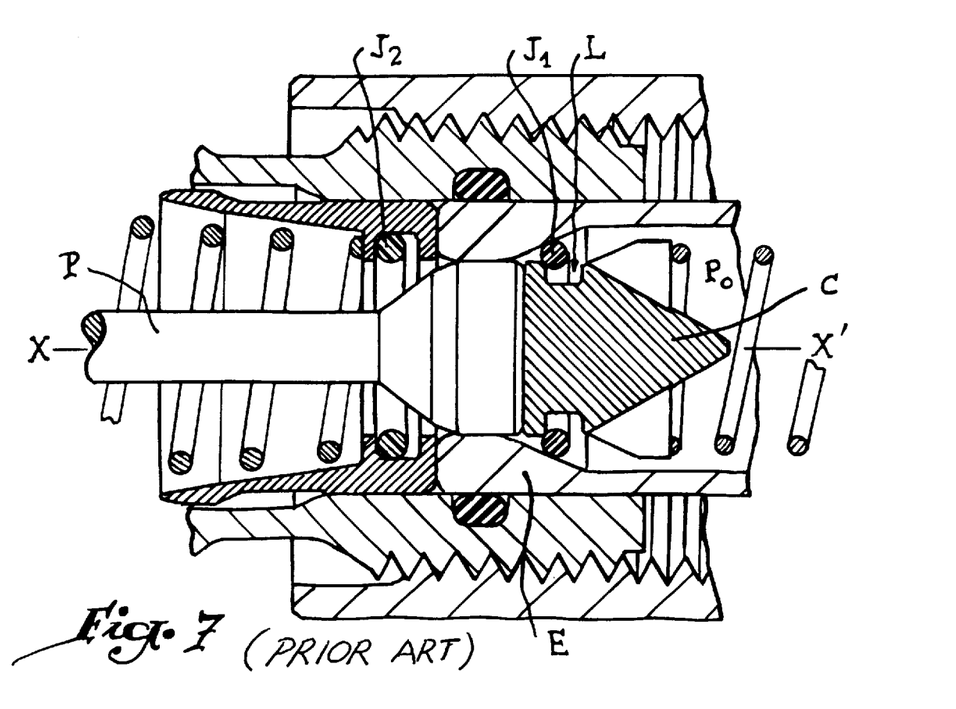
FIGS. 7 to 9 are schematic axial sections, similar to FIG. 2, for a circuit breaker of the prior art.
Figure 8:
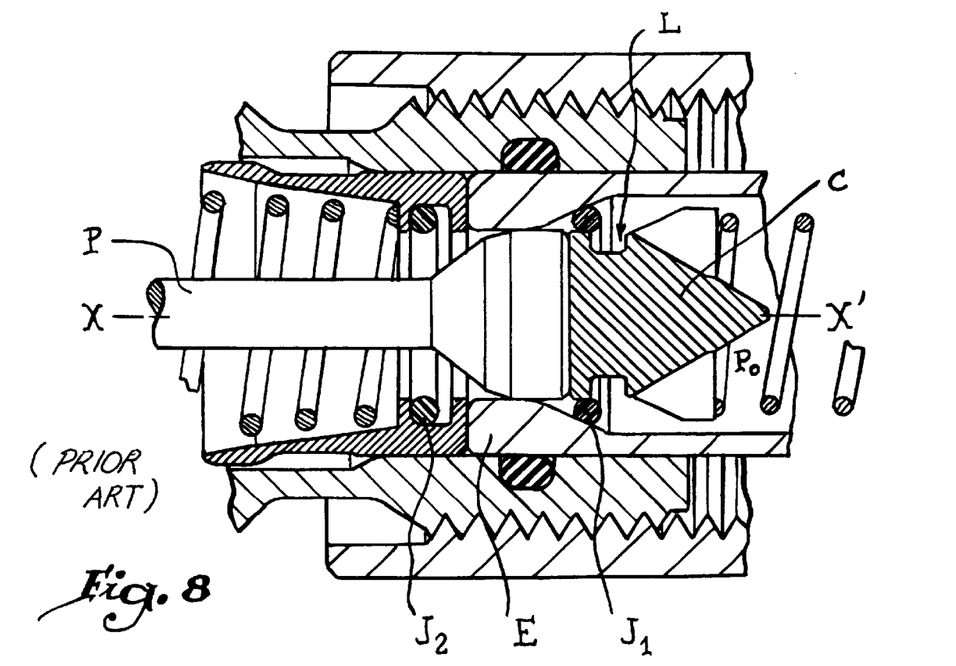
Figure 9:
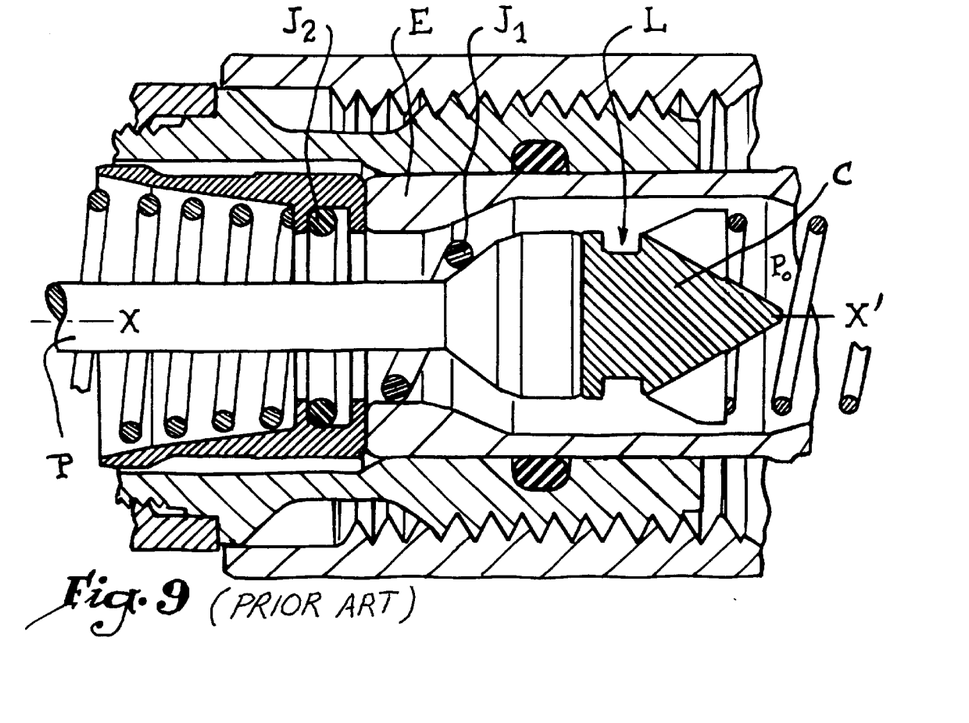

Such a circuit breaker is shown in accompanying FIGS. 7 to 9, these Figures corresponding to three successive positions of the elements constituting the circuit breaker when the male and female elements are coupled. O-rings $J_1$ and $J_2$ are respectively provided, around a mobile valve C and a piston P for maneuvering this valve, to abut against sealing surfaces of a connector E or of the piston P. Taking into account the pressure $P_0$ prevailing around the valve C in the position of FIGS. 7 and 8, the O-ring $J_1$ tends to be driven from the housing L made on the periphery of the valve C and to slide up to around the piston P, as shown in FIG. 9. A similar dislocation may occur during an opening of the circuit breaker. This operational defect is unacceptable, since the seal between the valve and the connector is in that case no longer ensured, due to the absence of the O-ring $J_1$.

When the male connection, located to the left in FIGS. 7 to 9, is connected to a source of pressure, while the female connection is connected to a fluid-consuming installation, the difference in pressure is reversed with respect to that shown in FIGS. 7 to 9 and the risk of dislocation principally concerns joint $J_2$.

In any case, as soon as the difference in pressure between the two conduits connected to the male and female elements attains a critical value, one of the joints risks being ejected. This critical value depends on the fluid, on the nature of the joint and on the geometry of the elements constituting the circuit breaker. It may be less than 5 bars for circuit breakers used conventionally, with the result that the danger of ejection of a joint is present under the normal conditions of use of the circuit breaker.

In order to overcome this drawback, it may be provided to mold the joint in a housing of the dove-tail type, to crimp the joint or to effect an assembly with the aid of two pieces which imprison the joint. These solutions are expensive and require a more complex assembly, thus increasing manufacturing time. These solutions also render the foreseeable maintenance operations on the circuit breaker delicate.

It is a particular object of the present invention to overcome these drawbacks, by proposing a circuit breaker in which the risks of ejection of a joint with respect to its accommodating housing are very substantially reduced, if not eliminated.

SUMMARY OF THE INVENTION

To that end, the invention relates to a circuit breaker for an installation handling fluid under pressure comprising an internal valve, at least one joint in substantially toroidal form, or O-ring, being disposed in an accommodating housing around the valve and/or a member for maneuvering the valve, characterized in that this housing is connected, via at least one fluid-circulation channel, to a counter-pressure zone formed downstream of the joint around the valve or the maneuvering member.

Thanks to the invention, the pressure prevailing in the counter-pressure zone may exert on the joint an effort with a centripetal component tending to return it towards the inside of its accommodating housing, which makes it possible to balance the possible forces tending to drive the joint from its housing.

According to a first advantageous aspect of the invention, during a transitory phase of opening of the valve, a circuit for preferential flow of the fluid is arranged between this housing and this counter-pressure zone, through said channel. Thanks to this aspect of the invention, the counter-pressure prevailing in the counter-pressure zone presents a sufficient value to balance the supply pressure of the circuit breaker.

According to another advantageous aspect of the invention, the preferential flow circuit presents such a geometry that the pressure drops that it induces on the fluid during flow are less than the pressure drops induced on this fluid by a principal flow circuit of the fluid defined between the valve, the maneuvering member and/or a sealing body. Such distribution of the pressure drops guarantees the creation of a counter-pressure in the counter-pressure zone prior to the circulation of the fluid towards the downstream part of the circuit breaker during an opening of the valve, which makes it possible to create the counter-pressure before the forces on the joint tend to drive it from its housing. In that case, the principal flow circuit of the fluid may provided with obstacles adapted to increase the pressure drops induced on the fluid. Such obstacles are advantageously formed by annular grooves disposed on at least one of the opposite faces of the maneuvering member, the valve or the sealing body located downstream of the joint.

According to another aspect of the invention, the cross-section of passage of the preferential flow circuit is greater than the corresponding cross-section of passage of a principal flow circuit of the fluid defined between the valve, the maneuvering member and/or a sealing body. According to another approach, it may be provided that, under the same conditions, the total length of the preferential flow circuit is shorter than the corresponding length of the principal flow circuit.

According to another advantageous aspect of the invention, the housing is connected to the counter-pressure zone via a plurality of fluid circulation channels distributed around the axis of displacement of the valve. This multiplicity of channels allows a good distribution of the counter-pressure zone and of the effort exerted on the joint around this axis.

According to another advantageous aspect of the invention, the housing is connected, via at least one fluid circulation channel, to a pressurized fluid zone formed upstream of the joint. This second channel makes it possible to supply fluid under pressure to the internal volume of the housing, then the first circulation channel and the counter-pressure zone, whatever the positioning of the joint inside the housing. In that case, it may also be provided that the housing is connected to the pressurized fluid zone via a plurality of fluid circulation channels distributed about the axis of displacement of the valve.

BRIEF DESCRIPTION OF THE DRAWINGS

The invention will be more readily understood on reading the following description of a circuit breaker in accordance with its principle, given solely by way of example and made with reference to the accompanying drawings, in which.

DESCRIPTION OF PREFERRED EMBODIMENTS

Referring again to the drawings, the circuit breaker for hydraulic installation shown in FIGS. 1 to 5 comprises a male element A and a female element B, both provided to be tubular in shape. The male element A is formed by a connector A around which is disposed a nut 2 provided with an internal threading 3. The connector 1 containes a valve 4 provided to abut against a convergent surface or valve seat 1a of the end 1b of the connector 1. A spring 5, in abutment against a circlip 6 fixed in an inner groove 7 of the connector 1, exerts on the valve 4 an effort tending to apply it on surface 1a.

Figure 1:
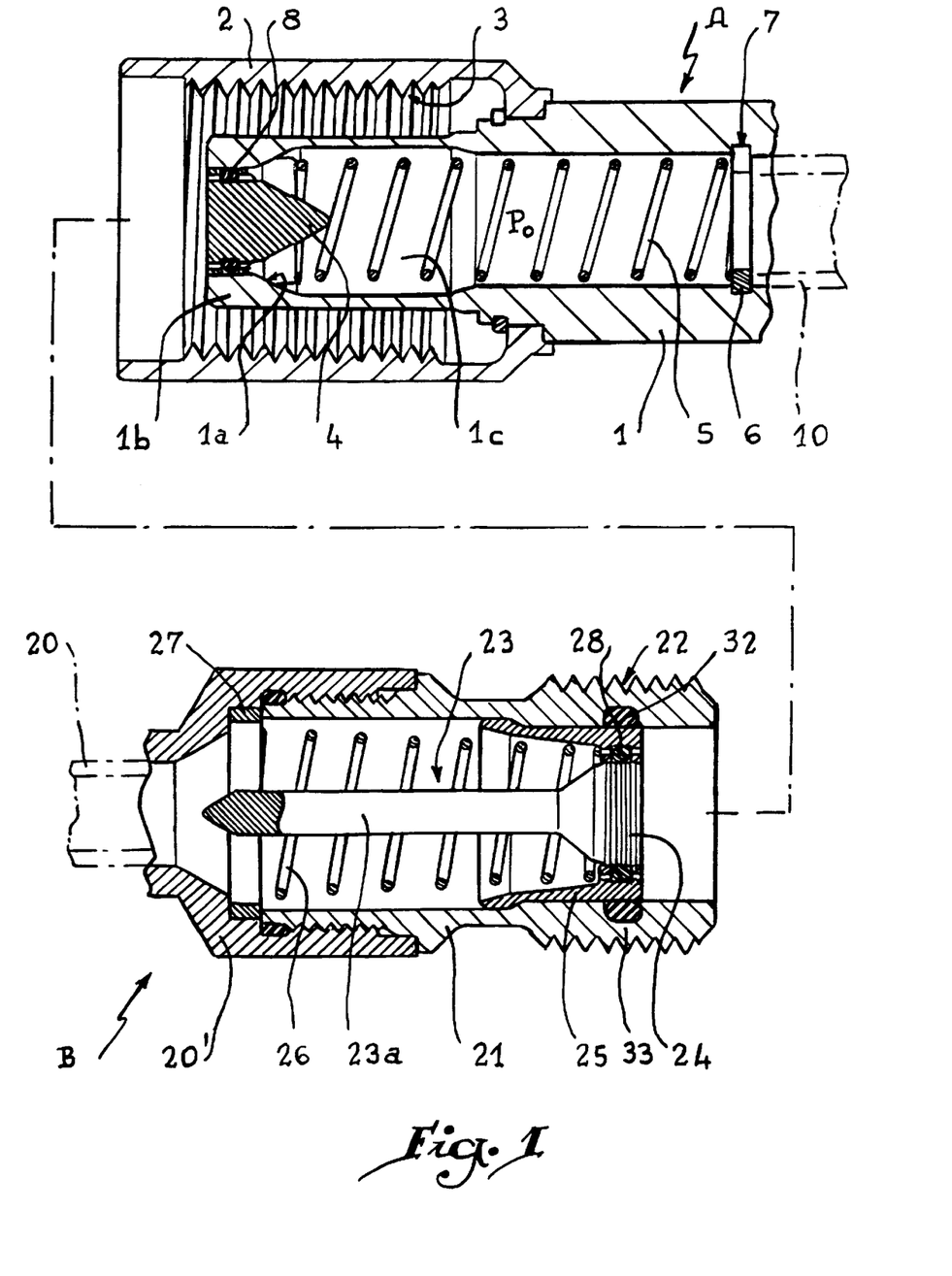
FIG. 1 is a schematic axial section of the two elements of a circuit breaker according to the invention before coupling.

A toric or substantially toroidal sealing joint seal , or O-ring, 8 is disposed in a peripheral housing 9 of the valve 4 to abut against the end 1b of the connector 1 in position of closure or of locking of the circuit breaker, as shown in FIG. 1.

In the example shown, a conduit 10 connected to the connector 1 is connected to a pressurized source of fluid such as water, with the result that a pressure $P_0$ prevails inside the connector 1.

As for the female element B, it is connected to a conduit 20 connected to a device using the pressurized fluid coming from conduit 10. The female element B comprises a sleeve 21 provided with an external threading 22 provided to cooperate with the internal threading 3 of the nut 2. In other words, by screwing the elements 2 and 21 together, the connector 1 penetrates inside the sleeve 21 in accordance with the sequence shown in FIGS. 2 to 5.

The sleeve 21 contains a piston 23 of which the head 24 presents a cross-section substantially identical to that of the valve 4, with the result that it can penetrate inside the end 1b of the connector 1, pushing the valve 4 against the force exerted by the pressure $P_0$ and the spring 5.

XX' designates the axis of displacement of elements 4, 23 and 24 inside with respect to the connector 1.

A counter-valve 25 is disposed around the head 24 of the piston 23. This counter-valve undergoes an effort of thrust or force in the direction of the opening of sleeve 21, this effort being due to an elastic return spring 26 in abutment against a washer 27 immobilized between the sleeve 21 and an end connection 20' of the conduit 20 screwed on the sleeve 21.

An O-ring 28, toric or substantially toric, is disposed in a housing 29 made in the counter-valve 25 so as to abut against the outer radial surface of the head 24 of the piston 23 in the position of FIG. 1.

A toric O-ring 32 is provided, near the opening of the sleeve 21 in a housing 33, so as to abut against the outer radial surface of the connector 1 when elements A and B are coupled.

By screwing the nut 2 on the sleeve 21, the connector 1 is displaced inside the sleeve 21, pushing the counter-valve 25, while the piston 23 may be maintained immobile with respect to the conenctor 21 to which it is kinematically connected by a rod 23a secured to the washer 27. In this way, the head 24 of the piston 23 penetrates inside the end 1b of the connector 1 as this connector penetrates inside the sleeve 21.

In accordance with the invention, the housing 9 is connected downstream of the valve 4, i.e. to the front face of the head 24 of the piston 23, via at least one channel 40, two channels being shown in the Figures. Each channel 40 connects the internal volume of the housing 9 to a peripheral zone 41 defined between the outer surface of the valve 4 and the inner surface 1a of the connector 1, i.e. radially around the valve 4. Taking the foregoing into account, the pressure prevailing in zone 41 is equal, to within the pressure drops, to the pressure $P_0$ prevailing inside the connector 1.

Figure 3:
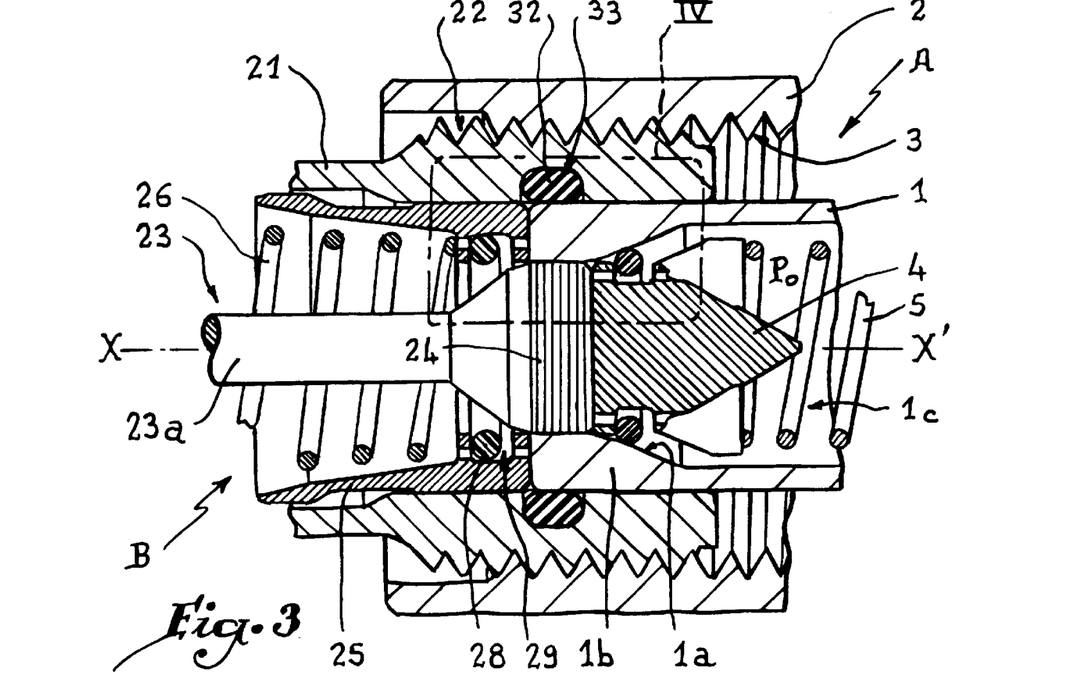
FIG. 3 is a view similar to FIG. 2 with the device in a second position
Figure 4:
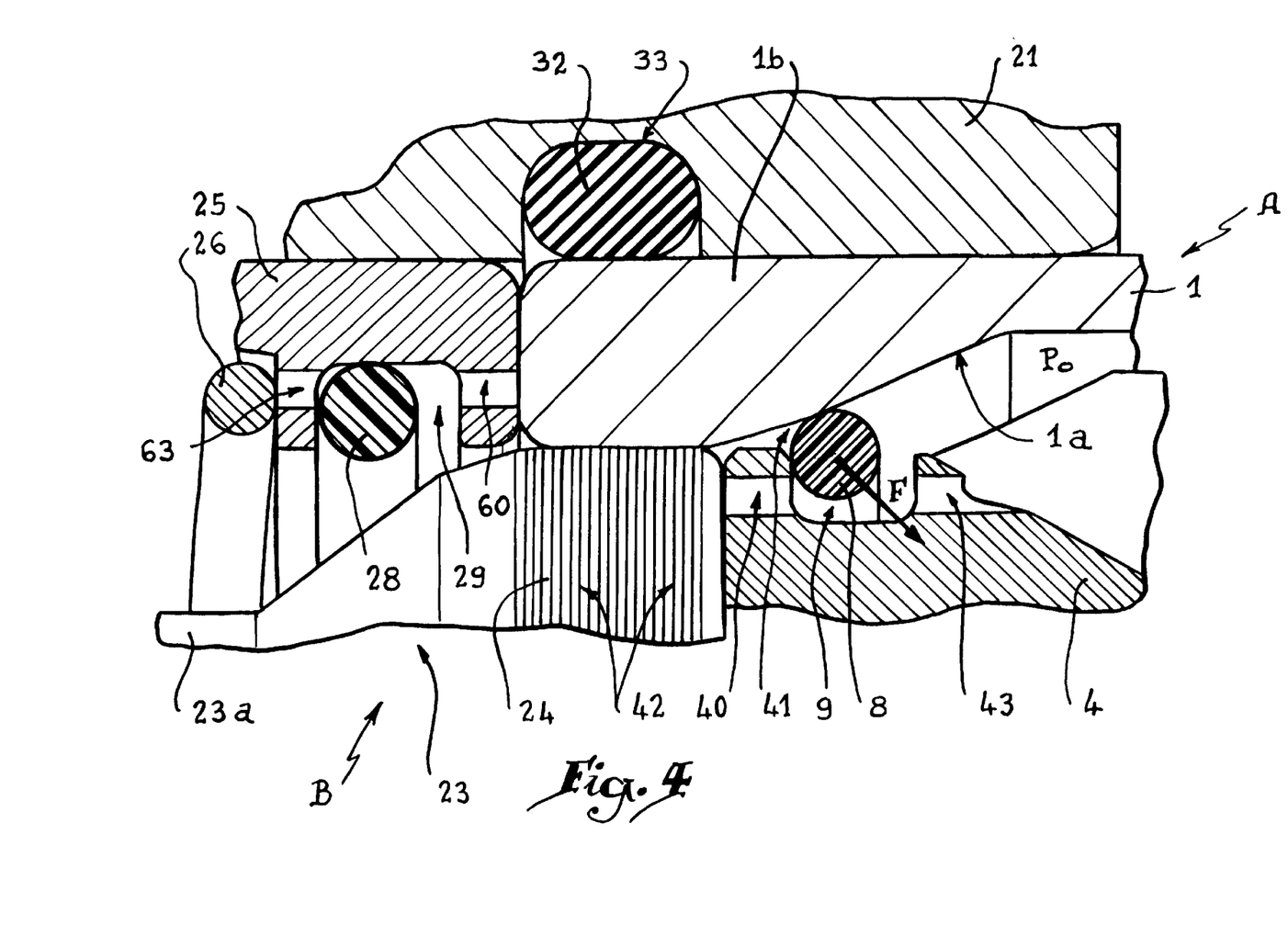
FIG. 4 is a view on a larger scale of detail IV of FIG. 3.

When the piston 23 pushes the valve 4 up to the position of FIGS. 3 and 4, the zone 41 extends up to the vicinity of the joint 8, with the result that the pressure $P_0$ is exerted on the joint 8 on the downstream side thereof and produces an effort represented by arrow F in FIG. 4.

The equilibrium of the forces exerted on the joint 8 by the pressure $P_0$ prevailing upstream and downstream of this joint has for its effect to guarantee stability thereof. It does not tend to be driven or dislocated out of the housing 9.

In order to ensure that pressure $P_0$ or a slightly lower pressure effectively prevails in zone 41 in the position of FIG. 4, a preferential fluid flow circuit between housing 9 and zone 41 is created through the channels 40, this preferential circuit inducing lower pressure drops on the fluid than the circuit defined between the outer radial surface of the head 24 of the piston 23 and the inner radial surface of the end 1b of the sleeve 1 in the positions of FIGS. 2 to 5, i.e. during a transitory phase of opening of the valve 4. To that end, the functional clearance between pieces 24 and 1 is smaller than the functional clearance between pieces 4 and 1, with the result that the cross-section of passage of the circuit made between the housing 9 and the zone 41 is greater than the cross- section of passage of the circuit made between pieces 24 and 1.

In practice, the preferential circuit is constituted thanks to the functional clearance between pieces 4 and 24 on the one hand, 4 and 1 on the other hand. In order to increase the apparent cross-section of passage of this preferential circuit, radial notches (not shown) may be provided at the channels 40 on the downstream face of the valve 4 or on the front face of the head 24, these notches promoting communication of channels 40 and zone 41.

The circuit produced between the channels 40 and the zone 41 is also preferential in that it is shorter than the circuit produced between the elements 24 and 1. In effect, the bearing surface between the head 24 and the end 1b of the sleeve 1, as is visible in FIG. 4, is substantially larger than the bearing surface between the valve 4 and the head 24, with the result that, with equivalent functional clearance, the fluid would tend to head towards zone 4 rather than towards the internal volume of the sleeve 21.

In order to increase further the preferential character of the fluid circuit made between the channels 40 and the zone 41, the outer peripheral surface the head 24 may be provided with annular grooves 42 intended to form disturbances in the flow of the fluid between the elements 24 and 1b, so as to increase the pressure drops.

In any case, the purpose of the preferential character of the fluid flow circuit between the channels 40 and zone 41 is to ensure that the pressure $P_0$, or a pressure substantially equivalent to this pressure, serves as counter-pressure in the zone 41 to exert on the joint 8 an effort tending to return it towards the inside of the housing 9.

Figure 2:
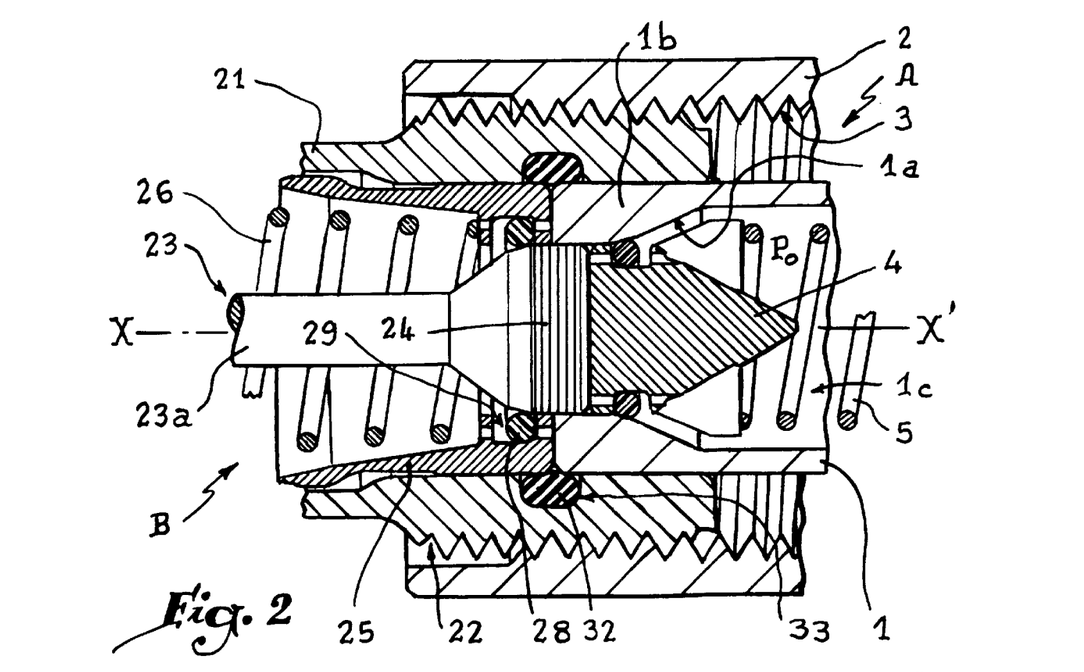
FIG. 2 is a partial axial section of the circuit breaker of FIG. 1 during coupling in a first position.

In practice, the channels 40 of the preferential circuit are not placed under pressure as long as the joint 8 remains in place in the housing 9, as shown in FIG. 2. The displacement of the joint 8 towards the outside of the housing 9 then has for its effect to open the entrance of the channels 40 which are then placed under pressure, such pressurization resulting in a corresponding pressurization of the zone 41, which has for its effect to create the effort represented by arrow F and to force the joint 8 down towards the inside of the housing 9. In other words, it is the deformation or the displacement of the joint 8 towards the outside of the housing 9 which generates the effort of return of this joint into place.

Furthermore, the housing 9 is connected to the principal internal volume 1c of the connector 1 thanks to a plurality of channels 43 of which two are visible in the FIGURES, these channels allowing a circulation of the fluid in the direction of the channels 40 independently of the position of the joint 8 inside the housing 9.

The channels 43 are advantageously disposed opposite the channels 40, with the result that channels 40 and 43 may be made in one boring operation, parallel to axis XX'.

Channels 40 and 43 are advantageously regularly distributed about axis XX' so that the counter-pressure zone 41 is supplied symmetrically about axis XX'. The effort exerted on the joint 8 thanks to the counter-pressure prevailing in this zone is thus likewise regularly distributed about this axis.

In practice, the number of channels 40 and 43 is included between 3 and 64, preferably between 3 and 12. Of course, for a circuit breaker of large diameter, the number of channels 40 and 43 might be greater.

Figure 5:
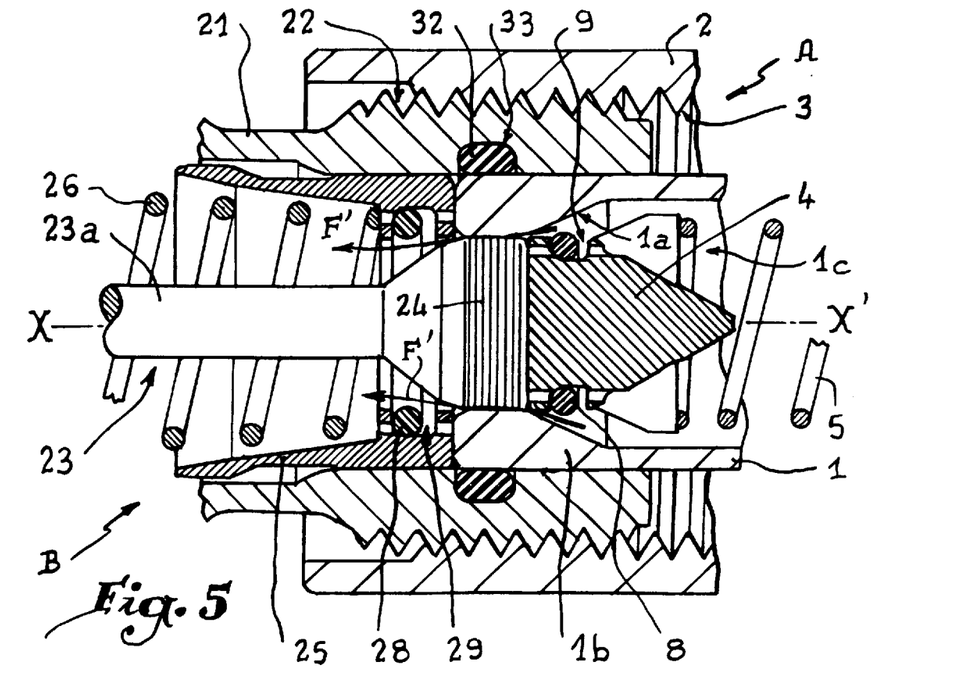
FIG. 5 is a view similar to FIG. 2 with the device in a third position.

Thanks to the invention, in the position of FIG. 5, the joint 8 has been forced down towards the inside of the housing 9, while the fluid may flow in the direction of the internal volume of the sleeve 21, as represented by arrows F'.

The continued movement of screwing of the nut 2 on the sleeve 21 has for its effect to displace the head 24 of the piston 23 towards the inside of the connector 1, with the result that, taking into account the flared character of the surface 1a, the cross-section of the fluid flow circuit between pieces 1 and 24 is increased to such a point that the pressure drops exerted on the fluid are very substantially reduced.

Figure 6:
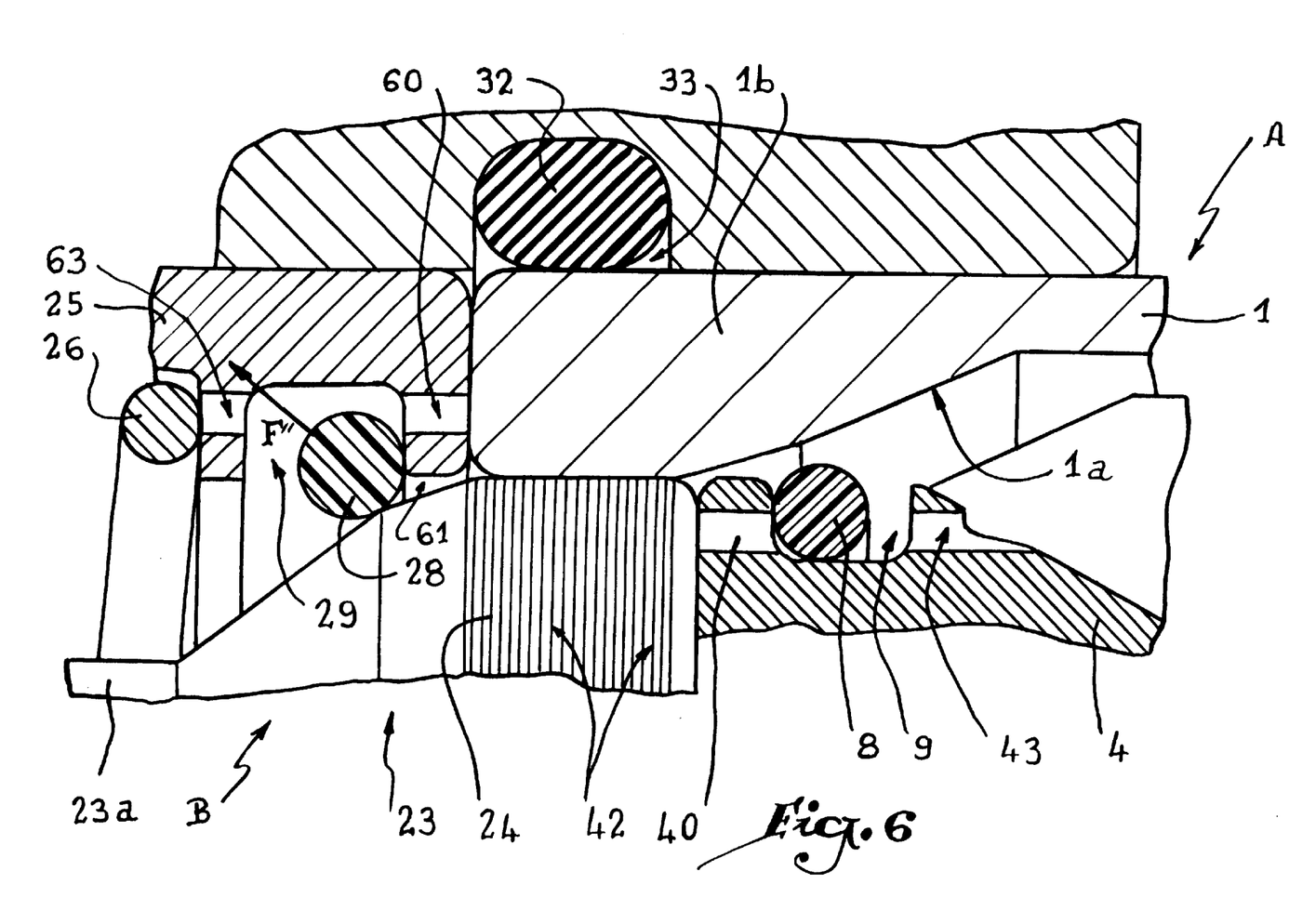
FIG. 6 is a view similar to FIG. 4 with the device connected differently.

The invention has been presented with the male element A connected to a source of pressure. It is also applicable to the case of the female element B being connected to a source of pressure, while the male element A is connected to a fluid consuming device or installation as shown in FIG. 6.

In order to avoid a dislocation of the joint 28 with respect to its housing 29, channels 60 and 63 are respectively provided downstream and upstream of the joint 28, so as to allow supply of a counter-pressure zone 61 formed radially around the head 24 of the piston 23.

Under the effect of the pressure $P'_0$ prevailing in the sleeve 21, the joint 28 is displaced towards a zone of lesser pressure, i.e. in the direction of the head 24 of the piston 23. The counter-pressure prevailing in the zone 61 exerts on the joint 28 an effort represented by arrow F" in FIG. 6, this effort tending to push this joint towards the inside of the housing 29.

As previously, the channels 60 and 63 are regularly distributed about axis XX'. Obstacles may be provided on the outer radial surface of the valve 4 in order to increase the pressure drops during the transitory phases of opening of the valve in order to create a preferential flow circuit between the housing 29 and the counter-pressure zone, through the channels 60.

Whatever the mode of connection of the circuit breaker, annular grooves may also be provided on the inner surface of the end 1b of the element 1. In any case, other types of obstacles intended to increase the pressure drops may be envisaged.

The invention has been described with reference to a circuit breaker for an incompressible or scarcely compressible fluid installation. It remains applicable for other types of installations, in particular adapted to compressible fluids such as gases. The invention may also be employed with diphasic fluids which are, as a function of the conditions of use, in liquid or gaseous form and in particular with a heat-exchanging fluid such as freon.

What is claimed is:

1. A circuit breaker for handling fluid under pressure, the circuit breaker including a connector having a fluid passageway therethrough which is closable by a valve movable along an axis of displacement with respect to a valve seat, a first annular seal seated within a first annular housing formed in a portion of said valve for normally sealing an interface between said valve and said valve seat when said valve is seated against said valve seat to close fluid flow through said passageway, at least one first fluid circulating channel for introducing fluid under pressure into a first counter-pressure zone downstream of said first annular seal toward said interface and encircling said first annular seal whereby upon initial opening of said valve fluid under pressure enters said first counter-pressure zone and urges said first annular seal within said first annular housing.

2. The circuit breaker of claim 1 wherein said at least one first fluid circulating channel is configured such as to create a pressure loss on fluid entering said first counter-pressure zone which is less than a pressure loss of fluid passing between said valve and said valve seat when said valve is opened with respect to said valve seat.

3. The circuit breaker of claim 2 including means within said circuit breaker downstream of said first annular seal for increasing turbulence of fluid passing through the circuit breaker to thereby increase pressure loss of fluid flow through the circuit breaker.

4. The circuit breaker of claim 2 wherein when said valve is opened with respect to said valve seat, a primary fluid flow circuit is created through said circuit breaker and a preferential flow circuit is created through said at least one first fluid circulating channel into said first counter-pressure zone, and a cross sectional area of said preferential flow circuit is greater than a cross sectional area of said primary flow circuit.

5. The circuit breaker of claim 1 which said first fluid circulating channel includes a portion formed in said valve and communicating said first annular housing with a downstream portion of said valve.

6. The circuit breaker of claim 5 in which said at least one first fluid circulating channel includes a second portion communicating said annular housing through a portion of said valve with an upstream portion of said fluid passageway.

7. The circuit breaker of claim 6 including a plurality of first fluid-circulating channels distributed in said valve about said axis of displacement.

8. The circuit breaker of claim 1 including a sleeve, means for connecting said sleeve so as to be in flow communication with said fluid passageway of said connector, a piston element mounted within said sleeve and being engageable with said valve on a side of said valve opposite said first annular seal, a second annular seal seated within a second annular housing adjacent said piston element, at least one second fluid circulating channel for introducing fluid flowing toward said interface through said sleeve to flow into a second counter-pressure zone intermediate said second annular seal and said interface whereby when fluid flows from said sleeve toward said valve upon an initial opening of said valve from said valve seat, a force is applied to said second annular seal by fluid flowing through said at least one second fluid circulating channel and into said second counter-pressure zone to force said second annular seal into said second annular housing.

9. The circuit beaker of claim 8 wherein said at least one second fluid circulating channel is configured to create a pressure loss of fluid entering said second counter-pressure zone which is less than a pressure loss of fluid passing between said piston element and said valve seat when said valve is opened with respect to said valve seat.

10. The circuit breaker of claim 8 including means within said circuit breaker for creating turbulence of fluid passing between said piston element and said valve seat to thereby increase pressure loss of fluid flowing therebetween.

11. The circuit breaker of claim 10 in which said piston element has an outer annular face, and a plurality of grooves formed in said outer face.

12. The circuit breaker of claim 9 in which fluid flowing through said valve seat relative to said valve and said piston element follows a primary flow circuit of a first cross sectional area, and fluid flowing through said second fluid circulating channel defines a preferential flow circuits having a cross sectional area which is greater than said first cross sectional area of said primary flow circuit.

13. The circuit breaker of claim 12 in which said primary flow circuit defines a greater length than said preferential flow circuit.

14. The circuit breaker of claim 8 in which said second annular housing is formed in a second valve member encircling said piston, said at least one second fluid circulating channel including an opening in said second valve member communicating said second counter-pressure zone with said second annular housing.

15. The circuit breaker of claim 14 including a plurality of second fluid circulating channels formed in said second valve member.

16. A coupling member for a circuit breaker for handling fluid under pressure including a connector element having a first end portion and a second end portion, said second end portion being adapted to engage an end portion of another coupling member, a fluid passageway through said connector element, a valve member movable along an axis of displacement relative to said second end portion of said connector element, an annular housing in said valve member, and annular seal seated within said annular housing, a counter-pressure zone within said connector element downstream of said annular seal and toward said second end portion, and at least one fluid circulating channel within said connector element for introducing fluid under pressure from upstream of said annular seal into said counter-pressure zone whereby when fluid under pressure passes from said first end portion of said connector element and through said second end portion of said connector element, the fluid under pressure enters said at least one fluid circulating channel into said counter-pressure zone and urges said annular seal within said annular housing.

17. The coupling member of claim 16 wherein said at least one fluid circulating channel is formed in said valve member.

18. A coupling member for a circuit breaker for handling fluid under pressure including first and second connector elements each having a first end portion and a second end portion with said second end portions with being adapted to engage with one another in coupling relationship, a fluid passageway defined along said first and second connector elements, a valve seat defined along said fluid passageway, a first valve member movable within said first connector element relative to said valve seat and being displaceable along an axis of displacement, a second valve member movable within said second connector element, an annular housing in each of said first and second valve members, an annular seal mounted within each of said annular housings, a counter-pressure zone within each of said connector elements adjacent said second end portions thereof and adjacent said annular seals, and at least one fluid circulating channel within each of said first and second connector elements for introducing fluid under pressure toward said annular seals to urge said annular seals into their respective annular housings when fluid passes from said first end portion toward said second portion of said connector elements, respectively.

* * * * *